Patented Aug. 11, 1936

2,050,811

UNITED STATES PATENT OFFICE 2,050,811

PRIMARY DISAZO COMPOUNDS

Robert Schuloff, Vienna, Austria, assignor to I. G. Farbenindustrie Aktiengesellschaft, Frankfort-on-the-Main, Germany No Drawing. Application January 31, 1934, Serial No. 709,194. In Austria August 10, 1932

8 Claims. (Cl. 8—5)

My present invention relates to new disazo dyes for dyeing leather.

A further object of my invention is the process for manufacturing these new dyes. Additional objects are the process for dyeing leather with these new dyes and the dyed materials thus obtainable.

I have found that disazo dyes corresponding to the general formula—

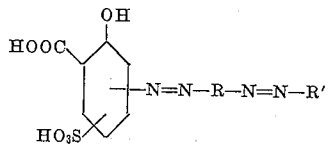

in which R is a hydroxy compound of the benzene or naphthalene series capable of coupling twice, R' is a radicle of the benzene or naphthalene series containing at least one nitro group, are preeminently suitable for dyeing leather and give deep, generally full brown dyeings of excellent fastness, which may be varied to more yellow or more bluish tints by a suitable selection of the components R and R', if the dyeing operation is carried out in the manner usual for acid azo dyes. Dyes of the general formula given above, are obtainable by combining in the first stage of operation diazotized 4-amino-1-hydroxy-6-sulfophenyl-2-carboxylic acid or 6-amino-1-hydroxy-4-sulfophenyl-2-carboxylic acid or a substitution product thereof with a hydroxy compound of the benzene or naphthalene series, such as, for instance, 1,3-dihydroxybenzene, 1,3-hydroxybenzene-4- or 5-carboxylic acid, monohydrobenzenes, 1-hydroxynaphthalene, 2,6- or 2,7-dihydroxynaphthalene and substitution products of these compounds capable of coupling twice with disazo compounds.

From the large number of nitro amines useful for introducing the radicle R' into the above-named dye, I enumerate by way of example 1-amino-2- or 3- or 4-nitrobenzene, 4-nitro-2-amino-1-hydroxybenzene, 4,6-dinitro-2-amino-1-hydroxybenzene, 4-methyl-3-nitro-1-aminobenzene, 5-chloro-3-nitro-1-methyl-2-aminobenzene, 1-amino-4-nitronaphthalene-6- or 7-sulfonic acid and other nitro amines generally used in the manufacture of azo dyes. The shade of the dyes may be somewhat varied in reversing the two coupling operations, that means, preparing in the first stage a monoazo dye from a diazotized nitro amine enumerated above as representants for R' and a hydroxy compound capable of coupling twice and then preparing the disazo dye by combining the monoazo dye with diazotized aminohydroxysulfophenyl carboxylic acid.

The following examples serve to illustrate my invention, the parts being by weight:—

Example 1.—13.8 parts of the disodium salt of 6-amino-1-hydroxy-4-sulfophenyl-2-carboxylic acid and 3.5 parts of sodium nitrate are dissolved in 400 parts of water and allowed to flow into a mixture of 240 parts of ice and 22.5 parts of hydrochloric acid. After the diazotation is complete, the diazo solution is introduced into a mixture of 7.7 parts of 1,3-dihydroxybenzene-4-carboxylic acid and 9 parts of caustic soda dissolved in 200 parts of water. The mixture is stirred for some hours and gently heated for some time until the coupling is complete. Then 4 parts of caustic soda are added and the diazo solution obtained in known manner from 10 parts of 4,6-dinitro-2-amino-1-hydroxybenzene is allowed to flow slowly into the solution of the monoazo dye. The mixture is stirred and gently heated until the coupling is complete and the dye is separated by addition of common salt.

60 kgs. of deacidified chrome leather are allowed to swell in the vat with 30 liters of warm water. Then a solution of 350 grams of the dye prepared according to Example 1, dissolved in 10 liters of hot water is slowly added and distributed in the vat. After standing for 10 minutes, 40 cc. of formic acid of 85 per cent. strength diluted with 400 cc. of water are slowly added and the mixture is allowed to stand for further 20 minutes. Finally, the leather is stuffed as usual.

When substituting in the foregoing example 1.3-dihydroxybenzene for the resorcylic acid, a dye having similar qualities is obtainable. The dye containing phenol as middle component is more yellowish. 2,7-dihydroxynaphthalene, likewise, may be used as middle component.

Example 2.—23.3 parts of 6-amino-1-hydroxy-4-sulfophenyl-2-carboxylic acid are diazotized in the manner set forth in Example 1 and the diazo compound is allowed to run into a solution of 11 parts of 1,3-dihydroxybenzene and 16 parts of anhydrous sodium carbonate dissolved in 250 parts of water. Then 30.9 parts of 4-nitro-4'-aminodiphenylamine-2-sulfonic acid are diazotized in the usual manner. The solution of the diazo compound is allowed to run, simultaneously with a solution of 6 parts of caustic soda in 100 parts of water, into the solution of the monoazo dye, to which likewise a small amount of caustic soda (about 2 parts) are added. The dye is separated and worked up in the usual manner. It dyes chrome leather and vegetably tanned leather a beautiful, neutral brown tint.

It is obvious that my invention is not limited to the foregoing examples or to the specific details given therein. Other dyes, having similar properties, are obtainable by using as azo component one of the other hydroxy compounds mentioned above, capable of coupling twice with diazo compounds.

When using, for instance, a monohydroxybenzene compound, somewhat more yellow dyes are obtainable while dihydroxynaphthalenes yield more reddish to bluish brown shades. The shades of the final dyes may likewise be varied by electing another nitro amine as second diazo component.

What I claim is:—

1. The dyes corresponding to the formula

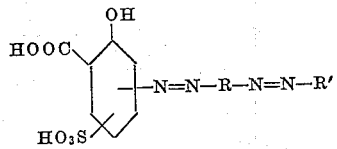

in which R means a hydroxy compound of the benzene or naphthalene series capable of coupling twice, R' means a radicle of the benzene or naphthalene series containing at least one nitro group, said dyes dyeing leather in an acid bath full, generally brown tints of excellent fastness.

2. The dyes corresponding to the formula

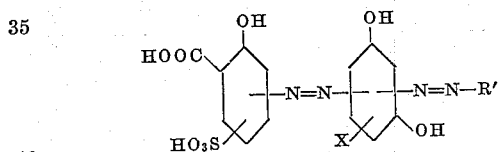

in which R' means a radicle of the benzene or naphthalene series containing at least one nitro group, X means hydrogen or COOH, said dyes dyeing leather in an acid bath full, generally brown tints of excellent fastness.

3. The process which comprises coupling a hydroxy compound of the benzene or naphthalene series capable of coupling twice with a diazotized aminosulfosalicylic acid and with a second diazotized nitro amine of the benzene or naphthalene series.

4. The process which comprises coupling a meta-dihydroxy compound of the benzene series capable of coupling twice with a diazotized aminosulfosalicylic acid and with a second diazotized nitro amine of the benzene or naphthalene series.

5. The process for dyeing leather which comprises treating the latter in an acid dyeing bath containing a disazo dye of the general formula

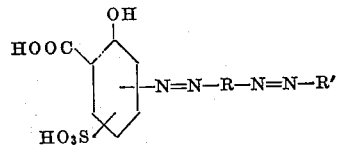

in which R means a hydroxy compound of the benzene or naphthalene series capable of coupling twice, R' means a radicle of the benzene or naphthalene series containing at least one nitro group.

6. The process for dyeing leather which comprises treating the latter in an acid dyeing bath containing a disazo dye of the general formula

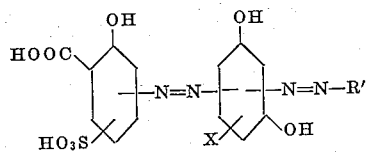

in which R' means a radicle of the benzene or naphthalene series containing at least one nitro group, and X means hydrogen or COOH.

7. An azo dye having the formula

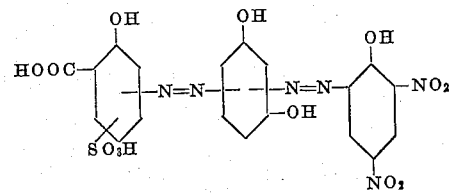

said dye yielding on leather brown tints of good fastness.

8. The process for producing an azo dye, suitable for dyeing leather fast brown tints, which comprises coupling resorcin with substantially one equivalent each of diazotized aminosulfosalicylic acid and diazotized picramic acid.

ROBERT SCHULOFF.